United States Patent [19]
Gaon et al.

[11] Patent Number: 5,202,139
[45] Date of Patent: Apr. 13, 1993

[54] PROCESS FOR PREPARING FAT FREE SNACK CHIPS

[75] Inventors: David Gaon, San Jose, Calif.; John Wiedersatz, Jeffersonville, Ind.

[73] Assignee: TGTBT, Ltd., Santa Barbara, Calif.

[21] Appl. No.: 828,406

[22] Filed: Jan. 31, 1992

Related U.S. Application Data

[63] Continuation-in-part of Ser. No. 712,196, Jun. 7, 1991, Pat. No. 5,180,601.

[51] Int. Cl.$^5$ ............................ A23L 1/00; H05B 6/00
[52] U.S. Cl. .................................. 426/242; 426/243; 426/804; 426/808
[58] Field of Search .............. 426/242, 243, 804, 808, 426/637

[56] References Cited

U.S. PATENT DOCUMENTS

| | | | |
|---|---|---|---|
| 3,365,301 | 1/1968 | Lipoma et al. | 426/242 |
| 3,469,996 | 9/1969 | Endres et al. | 219/10.55 A |
| 3,502,479 | 3/1970 | Singer et al. | 426/242 |
| 3,710,064 | 1/1973 | Matheer | 219/10.55 A |
| 3,765,425 | 10/1973 | Stungis et al. | 219/10.55 A |
| 3,989,849 | 11/1976 | Fogel et al. | 426/242 |
| 4,149,322 | 4/1979 | Minoda | 219/10.55 A |
| 4,283,425 | 8/1981 | Yuan et al. | 426/102 |
| 4,800,090 | 1/1989 | August | 426/243 |
| 4,906,483 | 3/1990 | Kloos | 426/243 |
| 4,933,194 | 6/1990 | Barry et al. | 426/144 |
| 4,933,199 | 6/1990 | Neel et al. | 426/438 |

FOREIGN PATENT DOCUMENTS 1151945  8/1983  Canada ................. 426/243

*Primary Examiner*—George Yeung
*Attorney, Agent, or Firm*—Poms, Smith, Lande & Rose

[57] ABSTRACT

A method and apparatus for preparing essentially fat free chips such as potato chips and the like having an appearance and taste similar to conventional chips without the use of deep fat frying processes. The method of the present invention includes the steps of exposing sliced raw potatoes and the like to a high intensity microwave field that rapidly converts moisture within the slice into steam. These exposed slices are then dried by longer exposure to a lower energy microwave field. The apparatus of the present invention includes a single mode meander waveguide with a microwave absorptive terminator at an end of the waveguide to support a standing wave field within the waveguide. Apertures are provided along portions of the waveguide to accommodate a microwave-transparent conveyor belt through the waveguide for transporting the potato slices and the like through the waveguide. The crisp chip type food product produced by this method and apparatus has not had any fat added to the chip and is therefore low in calories though having the conventional texture and taste associated with deep fat fried chip foods.

39 Claims, 3 Drawing Sheets

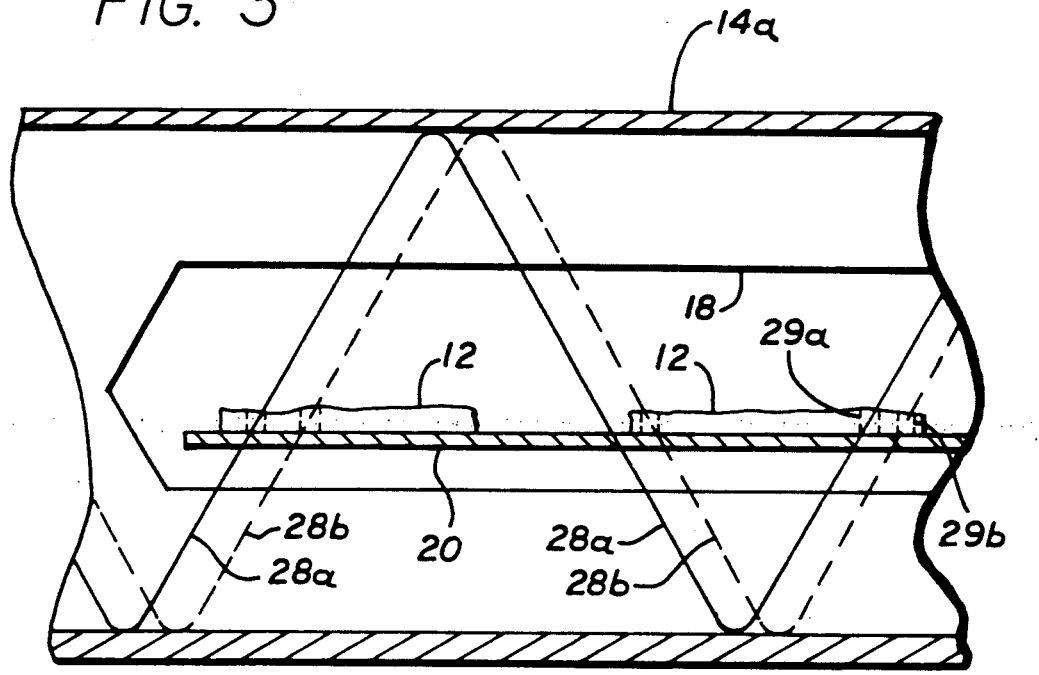
FIG. 3
FIG. 4
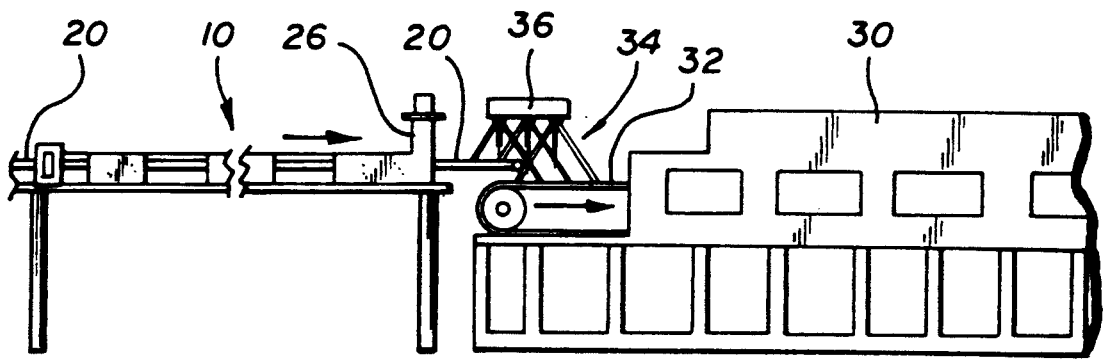
FIG. 5

PROCESS FOR PREPARING FAT FREE SNACK CHIPS

CROSS REFERENCE TO EARLIER APPLICATION

This is a continuation-in-part of application Ser. No. 07/712,196 filed Jun. 7, 1991, now U.S. Pat. No. 5,180,601, on behalf of the same inventors.

FIELD OF THE INVENTION

The present invention relates generally to a process and apparatus for preparing various kinds of chips without immersion in heated oil and, more particularly, to a fat free method for preparing potato chips.

BACKGROUND OF THE INVENTION

A variety of methods are known in the food preparation art for preparing snack foods such as potato chips and other forms of vegetable and grain chips such as corn or tortilla chips. Most of these methods, however, rely on cooking techniques in which the potato or other chip is immersed in a reservoir of hot oil for a period of time. Known as "deep fat" frying, the effect of this cooking process is to substantially reduce the water content of the potato slice while allowing some fat uptake. The moisture content of fresh potato slices is typically about 85% of the weight of the slice while "deep fat" fried potato chips commonly have a moisture content of less than 5% by weight. The deep fat frying process, however, also typically results in a finished potato chip having a fat content from about 30% to about 45% of the total weight of the finished chip.

The high fat content of conventionally prepared potato chips is considered undesirable by many people because of the increased caloric value and the relatively short shelf life of the resulting chip. The fat stored in a potato chip can become rancid after long term storage, imparting an undesirable odor and taste to the chip. A number of cooking methods have been developed in the past to reduce the fat content of potato chips and the like. U.S. Pat. No. 3,365,301 to Lipoma et al., for example, discloses a process for making fried chips by partially cooking potato slices in an oil bath at higher temperatures and for shorter periods of time than normally used in conventional oil immersion cooking processes, with a final cooking step employing electromagnetic heating, such as microwave heating. The higher temperature and shorter time period of the oil immersion portion of the Lipoma cooking process is believed to result in a final chip having a reduced fat content. This approach, however, does not eliminate the uptake of fat by the chip during the first step of the cooking process. Another approach, disclosed in U.S. Pat. No. 4,283,425 to Yuan et al., is to prepare potato chips by coating a raw potato slice with globular proteins and an optional layer of edible oil on top of the protein coating. The potato slice prepared in this fashion is then cooked by microwave heating. While eliminating the step of deep fat frying, the Yuan approach still produces a potato chip having an exterior coating of at least globular proteins. At column 3, lines 47-59 the Yuen patent states the protein coating is an essential element in successfully microwaving the potato slices. Use of microwave heating alone to prepare potato chips has previously been considered unsuitable because of gelatinization, a tendency of starches in the potato slice to coat the exterior surfaces of the slice and to form a gummy seal which hardens with further heating. The Yuen patent, for example, notes at column 2, lines 45-50 that efforts to remove more than 3% of the moisture content of a potato slice by microwave heating causes starch gelatinization.

Thus, there still exists a need for a method of preparing potato and like vegetable chips, as well as corn, tortilla and other grain chips, having both the taste and consistency of the widely known and broadly appreciated deep fat fried potato, corn and tortilla chips, but which are fat free or virtually fat free.

SUMMARY OF THE INVENTION

In broad terms the present invention concerns a method and apparatus for preparing potato, corn and other chips that is fast, economical and entirely free of any fat frying or oil coatings. The method of the present invention includes a first cooking step of exposing raw potato slices or other vegetable or grain slices to a very high intensity microwave field in order to rapidly convert a substantial portion of the moisture in the raw slice into steam. This intense microwave heating has the effect of puffing the slices and producing increased porosity and surface roughness. During this step the moisture content of potato slices can be reduced from an initial moisture content of about 80% of the weight of the potato slice to a final moisture content of about 25% to 30%. The potato slices are then subjected to a drying step, which can be a combination of low intensity microwaves and convective hot air heating to dry and crispen the puffed and roughened slices into completed chips.

In the preferred embodiment, slices of potatoes or other flat portions of appropriate vegetables, grains and the like are arranged in a single layer on a conveyor belt during the first high intensity microwave exposure step. In the case of potato slices that are being made into potato chips, surface moisture is first preferably, though not necessarily, removed from the raw potato slices. During the subsequent drying and crispening step, the potato or other product slices need not be arranged in a single layer but may, instead, be arranged in layers up to 4 inches thick. The potato or other product slices may also be seasoned by conventional processes between the first cooking and second drying steps, if desired.

The apparatus of the present invention includes a conveyor belt structure for supporting the potato slices in a single layer and a series of single mode traveling wave microwave waveguides each having a series of apertures through which the conveyor belt passes. A microwave terminator is also located at one end of each waveguide to maintain a substantially single mode of propagation within the waveguide. The conveyor belt is of a microwave-transparent material such as polypropylene or Teflon coated fiberglass. In one presently preferred embodiment the conveyor belt has a convex patterned surface to impart a curved shape to the cooked potato slice. A second apparatus combining both hot air convective heating and lower energy multimode microwave heating is disposed at an output end of the conveyor belt for the second drying step.

The novel features of the present invention will be better understood from the following detailed description, considered in connection with the accompanying drawings. It should be understood, however, that the drawings are for purposes of illustration and description

BRIEF DESCRIPTION OF THE DRAWINGS

FIG. 3 is a side view of a single section of the microwave waveguide of the present invention;

FIG. 4 is a perspective view of a potato slice after exposure to a single portion of the microwave waveguide during the cooking step;

FIG. 5 is a perspective diagram of one embodiment of the apparatus of the present invention;

DETAILED DESCRIPTION

The methodology of the present invention is suitable for the preparation of fat free chips made from a wide variety of vegetables, grains, fruit and the like which can be cut or otherwise formed into flat, generally thin slice-shaped portions. The methodology of the present invention is also suitable for the preparation of a variety of products that are traditionally baked such as crackers, some forms of biscuits and the like. The present invention is especially adapted for the preparation of fat free potato chips. The various types of potatoes traditionally preferred for conventional deep fat frying chip processes may be employed in the practice of the present invention. Some varieties of potatoes that have normally been undesirable for deep fat frying may also be employed in the practice of the present invention. Frozen potato slices may also be employed. The present invention may be used to prepare chips from raw vegetables, potatoes and the like that have been cut into slices or, alternatively, vegetable, potato, corn or other grains may be ground into a dough or paste and then shaped into generally flat slice-shaped configurations for preparation into a chip. In this description, the term raw product slices shall mean any of the cut or formed slices comprising any of the items or materials described above. For clarity of explanation the present invention will be described in the context of preparing fat free potato chips. It should be understood, however, that the following description of the present invention is in no way intended to limit the invention to the preparation of potato chips alone.

Figure 1:
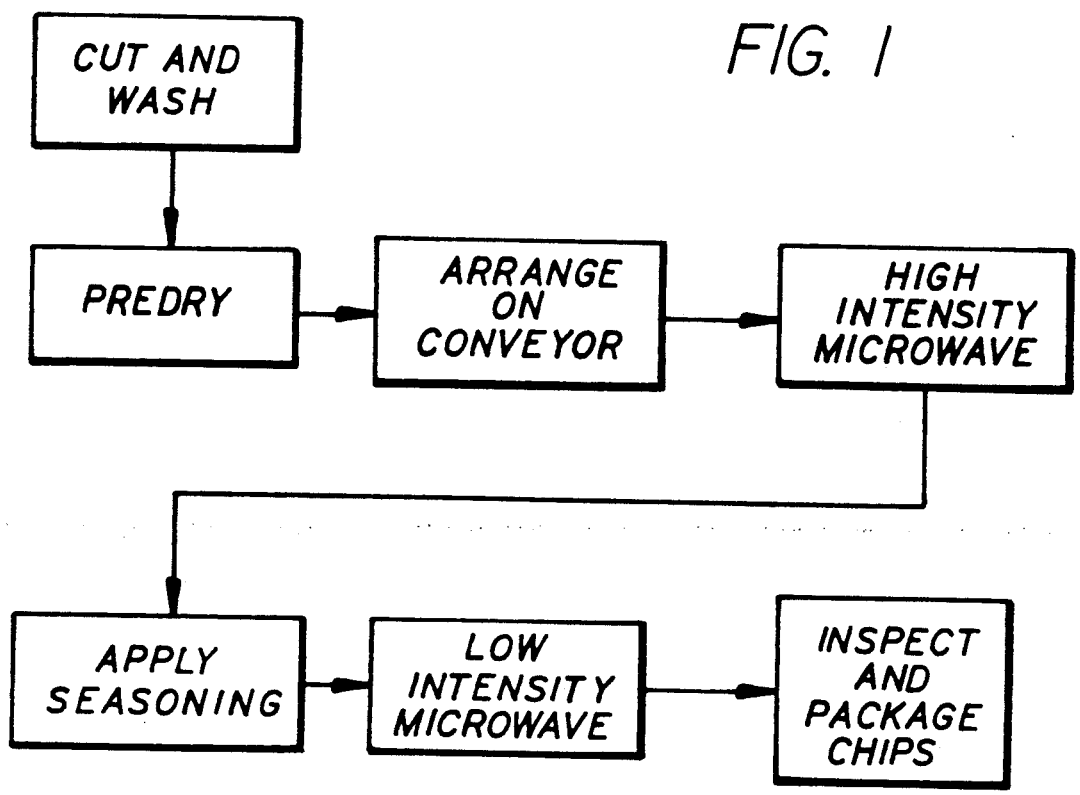
FIG. 1 is a flow chart of the method of the present invention.

Referring to the figures and, more particularly to FIG. 1, there is shown a flow chart of the method of the present invention. As shown, initial preparation of raw potato slices includes the steps of washing the raw potatoes and cutting them into slices. If desired, the potato may also be peeled prior to slicing, though peeling presently is not believed to be necessary. The potato slices may have thicknesses varying in a range, depending upon the desired thickness of the final chip. The thickness of the potato slice does not adversely affect the result of the microwave exposure cooking step. Typically, the potato slices are approximately 1/16 inch thick. Potato chips have been satisfactorily prepared by the method of the present invention using raw potato slices ranging from 40 to 70 thousandths of an inch in thickness. No surface coatings or layers are either required or desired on the exterior surfaces of the potato slices prior to the initial cooking step. Although surface moisture need not be removed from the exterior surfaces of the potato slices it has been determined removal of surface moisture facilitates the subsequent high intensity microwave exposure cooking step of the present invention. If the surface moisture is not removed, electrical arcing may occur between adjacent potato slices in contact with one another. This arcing may also occur across the surface of a raw potato slice. It is believed this arcing reduces the transfer of microwave energy to the potato slice and, in some instances, may leave undesirable scorch marks on the potato slices.

Preferably most of the surface moisture of the potato slices is removed prior to subjecting the potato slices to the intense microwave exposure of the cooking step. In one preferred embodiment of the chip preparation method of the present invention, removal of the surface moisture from the raw potato slices results in a reduction in the moisture content of the slices by about 5% to 6% by weight of the potato slice with a desired optimum of about 5.5% of the moisture content by weight being removed. Removal of a lesser amount of surface moisture may result in some arcing occurring between potato slices or across the surfaces of the potato slices. Removal of a greater degree of moisture can cause the formation of a starch layer on the surface of the potato slices. This starch layer typically adversely affects the taste of the resultant slice. It has also been discovered that the formation of a starch layer may adversely affect the taste of the resultant chip over time.

In one presently preferred embodiment, the removal of surface moisture is achieved by use of conventional "air knives" type air jets. Air knives are a type of forced air currents generally used to remove surface coatings. In this embodiment the air knives use heated jets of air that are directed from above and below the raw, freshly washed and sliced, potato slices. These air currents are typically within a range of temperature between about 150 and 250 degrees Fahrenheit, with a preferred temperature of about 185 to 190 degrees Fahrenheit. Typical flow rates for these hot air currents are preferably between about 50 and 60 cubic feet per minute.

As shown in the flow chart of FIG. 1, the potato slices are first exposed to a very high intensity microwave field for a brief period of time to rapidly convert moisture within the potato slice into steam which escapes from the slice. These substantially dehydrated slices are then dried and crispened. In the preferred embodiment this drying step is accomplished by exposure to a combination of hot air and lower intensity microwave heating to produce a fat free chip having a moisture content of only a few percent by weight. The chips are then in final form, ready for any desired final inspection and packaging. As shown in FIG. 1, seasonings, such as barbecue flavoring, may be applied by spraying the puffed and roughened potato slices after the initial cooking step and before the final drying step or, alternatively, after the final drying step. It is currently believed the taste of the final chip may be enhanced by applying a seasoning spray after the final drying step has been performed.

The very high intensity of the initial microwave field is purposely selected to rapidly convert a major portion of the moisture within the potato slice into a heated vapor. While typically raw potato slices have a moisture content of approximately 80% by weight, the initial exposure of the potato slices to the high intensity microwave field reduces the moisture content of the slices to about 25% to 30% by weight. Water vapor and steam occupy a substantially greater volume than the same quantity of water in liquid form. The rapid conversion into steam of the water within the potato slice thus has a desirable effect of also causing the potato slice to puff up. This steam quickly escapes from the potato slice, having the effect of increasing the roughness and surface porosity of the slice. The increased surface porosity facilitates further dehydration of the potato slice and also provides a desirably roughened outer texture characteristic of traditionally deep fried potato chips.

It is believed the rapid conversion of a substantial portion of the moisture in the potato slice into steam and the violent departure of the steam from the potato slice prevents gelatinization, the formation and hardening of a starch layer on the exterior surfaces of the slice. The intensity of the microwave field to which the potato slices are exposed can be varied, along with the duration of the microwave exposure, to achieve the desired effect of preventing gelatinization by rapidly converting water within the potato slice into steam that swiftly escapes from the potato slice. The duration of microwave exposure should be increased as the intensity of the microwave filed is decreased. Additionally, a higher intensity field may be desired if the thickness of the slice is increased. It is presently believed that gelatinization can be avoided for microwave exposure periods lasting up to several minutes if a sufficient high intensity microwave field is used. More specific ranges of microwave fields are presented in example below. After exposure to the high intensity microwave field, the puffed and roughened potato slices can then be dried into a chip without further concern for gelatinization. During the final drying step the moisture content of the potato slice is further reduced from about 25% to 30% by weight to a final moisture content of about 2% to 4% by weight.

Figure 2:
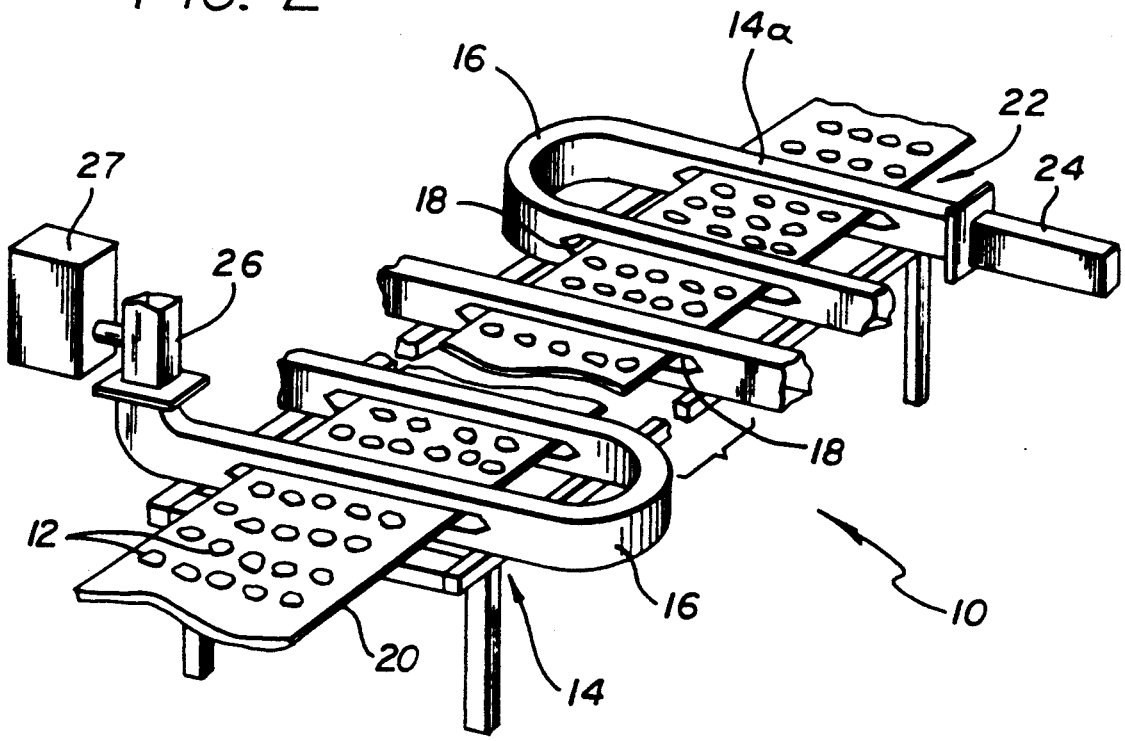
FIG. 2 is a perspective view of one preferred embodiment of the apparatus of the present invention for subjecting potato, vegetable and grain slices to a high intensity single mode microwave field during the cooking step.

The initial cooking step of exposing the potato slices to a high intensity microwave field in order to puff and roughen the slices by rapidly reducing the moisture content of the slices can be achieved by a variety of ways. In one preferred embodiment, a travelling wave microwave waveguide is employed along with a microwave-transparent conveyor belt to transport the potato slices through slots in the waveguide. Referring to FIG. 2, a preferred embodiment is shown having apparatus 10 suitable for exposing potato slices 12 to a suitably high intensity microwave field. The apparatus 10 includes a meander waveguide 14 through which a generally single mode microwave field propagates. The waveguide 14 doubles back on itself repeatedly through a series of 180 degree bends 16 and is provided with a series of long, narrow apertures 18 through which a conveyor belt 20 is disposed so as to transport the potato slices 12 through the multiple lengths of the waveguide 14. In this preferred embodiment, the waveguide 14 repetitively engages the conveyor belt 20 a total of twenty times, but only five straight-line lengths 14a of the waveguide 14 are shown in FIG. 1 for purposes of clarity. To faciliate formation of a single mode field within the waveguide 14, the end 22 of the waveguide 14 includes a water trap 24 to absorb substantially all of the microwave energy propagating through to the waveguide end 22. The number of straight-line portions 14a, of the waveguide 14 through which the potato slices 12 are carried may preferably be selected to optimize energy transfer from the microwave field within the waveguide 14 to the potato slices 12. Using the preferred embodiment having twenty straight-line waveguide portions 14a, approximately 80% of the initial microwave energy injected into the waveguide 14 is absorbed by the potato slices 12 as they are transported through the waveguide 14. A greater or lesser number of straight-line waveguide portions 14a could be selected if desired. Satisfactory microwave heating has been accomplished with the potato slices 12 travelling through as few as five straight-line waveguide portions 14a. In an alternative embodiment illustrated in FIG. 6 and discussed more fully below, multiple microwave waveguides are employed to repetitively cook the potato slices. In this embodiment when the potato slices are essentially raw, the microwave waveguides have as few as two straight line portions while the final waveguides through which the almost fully cooked potato slices pass have as many as six straight line portions.

In one preferred embodiment of the microwave apparatus 14 discussed above an input 26 to the waveguide is coupled to a microwave generator having a 60 kilowatt power output at 915 megahertz. The cross-sectional dimensions of the waveguide 14, selected to optimize microwave transmission at this frequency, are the standard dimensions of a waveguide bearing the mil.spec. designation WR 9.75, that is 9.75 inches by 4.875 inches. The energy density at the waveguide input 26 can thus generally be characterized as approximately 1.25 kilowatts per square inch. Other frequencies within the microwave band of the electromagnetic spectrum could be employed, if desired. Discontinuities in the waveguide 14 such as the apertures 18, edges of the conveyor belt 20 the potato slices 12 cause a standing wave pattern to form within the waveguide 14. As shown in FIG. 3, as a potato slice 12 is carried into the place of the paper through a straight-line portion 14a of the waveguide a standing wave pattern 28a causes only localized heating in a region 29a of the potato slice 12. Thus, after exposure to a first straight-line section of the waveguide 14, the potato slice 12 will have a generally "stripped" appearance as illustrated in FIG. 4. Each of the waveguide turns 16 is therefore configured to induce a shift in the position of the standing wave pattern within the straight-line section 14a of the waveguide 14 with respect to the conveyor belt 20, as illustrated in FIG. 3 by the standing wave pattern 28a and localized heated region 29a within the straight-line waveguide 14a shown relative to the position of a prior or subsequent standing wave pattern 28b disposed within an adjacent straight-line waveguide section (not shown). This displacement of the standing wave pattern 28a and 28b between adjacent straight-line waveguide sections 14a assures an even exposure of each potato slice 12 to microwave heating after the potato slice 12 has been conveyed through several straight-line waveguide sections 14a. To achieve this displacement it is sufficient to configure the waveguide turns 16 so that the circumference of radius of curvature down the middle of the waveguide differs from a whole number multiple of the wavelength of the microwaves being used to cook the potato slice.

The composition of the conveyor belt 20 is selected to be essentially transparent to the microwaves propagating within the waveguide 14 and to avoid adhesion of the potato slices 12 to the belt 20. In one preferred embodiment, the conveyor belt 20 is made of polypropylene. Alternatively, however, the conveyor belt 20 could be made of Teflon coated fiberglass. In the preferred embodiments of the present invention, the conveyor belt 20 has a convex, patterned shape configured to impart a curved shape to the cooked potato slices. Potato chips produced in accordance with the method of the present invention on a flat conveyor belt generally have a generally flat appearance that is not characteristic of traditionally deep fried potato chips. It has been found that a curved shape is preferably, though not necessarily, imparted to the potato slices during the microwave cooking step of the process of the present invention rather than the drying step.

As previously mentioned, the duration of exposure of the potato slices 12 to the high intensity microwave field is fairly brief. In the presently preferred embodiment of the microwave cooking structure discussed above and illustrated in FIG. 2, the conveyor belt 20 moves at a rate of 15–20 feet per minute. Each straight-line section of the waveguide 14 has a width of 4.875 inches, the potato slices 12 are subjected to an exposure time of 1.25–1.66 seconds each time the potato slices pass through a straight-line section 14a of the waveguide 14. In a system employing 20 straight-line waveguide sections 14a, the total exposure time for each potato slice 12 would be approximately 25 to 33 seconds. As mentioned above, the desired intensity of the microwave field can be varied inversely with the duration of exposure, so long as the field intensity is sufficient to convert moisture within the raw potato slice into steam rapidly enough to prevent formation and hardening of a starch layer. Thus power levels other than 60 kilowatts could be coupled to the waveguide input 26 to puff the potato slice and roughen its exterior surface so long as the rate of travel for the conveyor belt 20 is properly increased or decreased. Power levels as low as 25 kilowatts with associated input energy densities as low as 630 watts per square inch have been successfully used to prepare potato chips by the method and apparatus of the present invention. The inventors believe microwave energy levels as low as 3–4 kilowatts could be coupled to the waveguide input 26 to satisfactorily cook potato slices by the method and apparatus of the present invention. At microwave input energy levels below 3 kilowatts however, it is believed there is inadequate heating of the potato slice in a sufficiently brief period of time to achieve the desired effects in the potato slice without the additional formation of an undesirable starch layer. Thus, coupling lower energy levels to the microwave input 26 could be engineered to subject the potato slices 12 to sufficient microwave energies to eventually achieve a desired degree of dehydration the potato slices (for example by reducing the rate of travel for the conveyor belt to increase the duration of microwave exposure), but not before the formation of a starch layer occurs. As noted above this starch layer imparts an undesirable taste to the resultant chip or, in some instances, reduces the shelf life of the resultant chip.

Because a large amount of moisture escapes from the potato slices 12 during exposure to the high intensity microwave field, hot air convection can be employed to minimize condensation within the waveguide 14. Such condensation would decrease the amount of microwave energy available for transfer to the potato slices 12. In the preferred embodiment, hot air blowers 27 maintain the ambient temperature at and around the waveguide 14 at approximately 300° F. The hot air blowing through the waveguide 14 also contributes to the dehydration of the potato slice during this first cooking step. Other anti-condensation schemes can, of course, be employed. For example, lower temperature air movement could be employed along with electrical heating of the waveguide 14.

Figure 6:
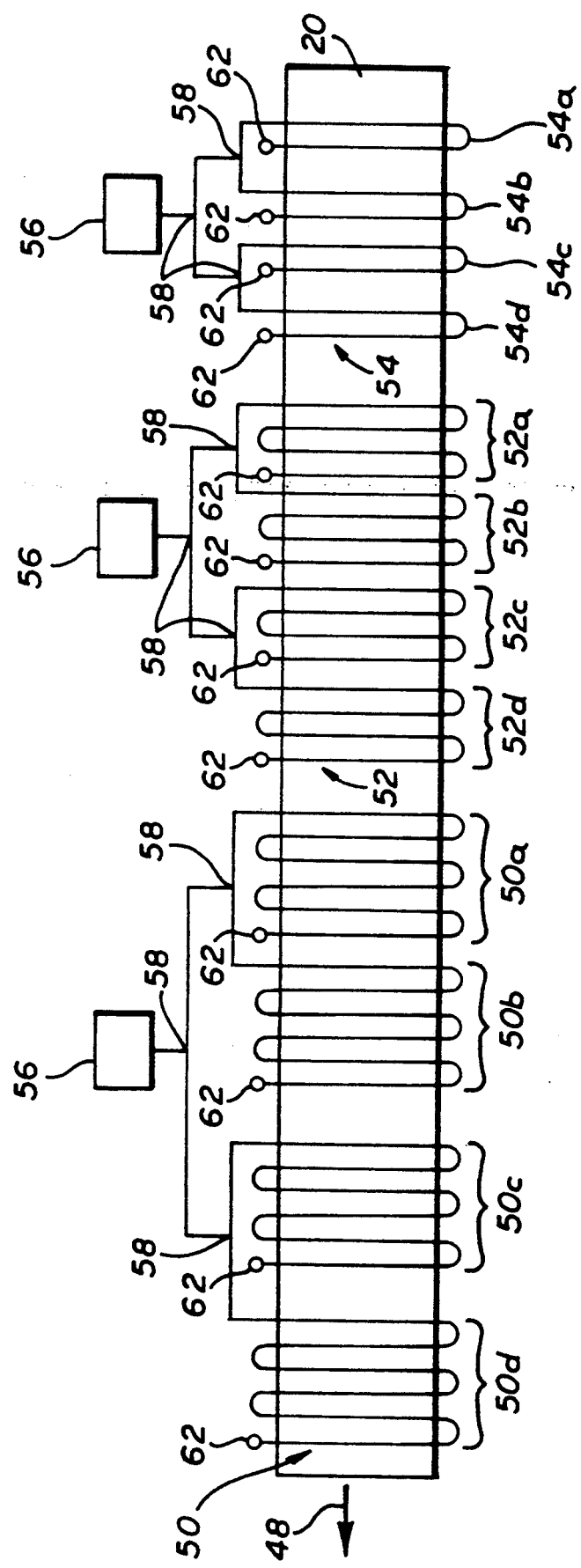
FIG. 6 is a diagrammatic representation of an alternative embodiment of the microwave waveguide apparatus of the present invention for exposing a product slice to a high intensity microwave field.

Referring to FIG. 6 there is shown an alternative embodiment of the apparatus of the current invention suitable for implementing the high intensity microwave cooking step of the method of the present invention. It is believed the raw potato or other product slices absorb a substantial portion of the microwave energy propagating within the microwave waveguide within the first few straight line portions of the waveguide that engage the conveyor belt. It is also believed that the amount of microwave energy adsorbed by the potato or other product slices each time the potato or product slices passes through a straight line portion of the waveguide decreases with the reduction of the moisture within the product slice. Accordingly, it is believed a more efficient transfer of microwave energy to the product slice is achieved by using multiple microwave power supplies and fewer microwave waveguide portions per power supply.

As shown in FIG. 6 a microwave transparent conveyor belt 20 engages a series 50, 52 and 54 of microwave waveguides with each series of waveguides coupled to a separate microwave power supply 56. The conveyor belt 20 travels in the direction 48 indicated to the left of FIG. 6. To accommodate the decrease in microwave energy as the potato or other product slices are dehydrated, the number of straight line portions of microwave waveguide engaging the conveyor belt increases as the product slices are carried to the end of the conveyor belt 20. It is also believed the cost of the apparatus for the high intensity microwave step of the present invention can be reduced by using high power microwave power sources 60 and distributing the microwave output to several separate single mode waveguides. Thus, the microwave power source 56 coupled to the waveguide series 54 includes microwave dividers 58 to distribute microwave energy to four separate single mode waveguide 54a–d. These microwave dividers preferably evenly divide the microwave energy along each path. Such dividers are well known in the microwave art and are commonly referred to as "MAGIC-T's". Since the series of waveguides 54 is located at the upstream end of the conveyor belt 20 where the product slices still contain virtually all of their natural moisture, only a pair of straight line portions of each single mode waveguide engages the conveyor belt 20. To maintain generally single mode microwave propagation within the waveguides, each waveguide terminates in a microwave absorptive load 62 such as a water load.

Each successive series of waveguides 52 and 50 contain an increasing number of straight line waveguide portions. Thus, the series of waveguides 52 includes four straight line waveguide portions engaging the conveyor belt 20 for each separate waveguide 52a–52d coupled to the microwave power supply 56. Similarly the waveguide series 50 includes six straight line waveguide portions engaging the conveyor belt 20 for each separate waveguide 50a–50d coupled to the microwave power supply 56. Each of the separate waveguides in the series 52 and 50 similarly end in an microwave absorptive load 62. As in the other embodiment discussed above, each bend in the separate waveguides that couples a pair of straight-line waveguide portions together is also configured to induce a shift in the relative positions in the standing wave pattern formed in adjacent straight line portions.

In one presently preferred embodiment the microwave power supplies 56 each generate 60 kilowatts of microwave energy so that 15 kilowatts is launched into each single mode waveguide 50a-50d, 52a-52d and 54a-54d. Using a six foot wide conveyor belt 20 travelling at twenty feet per minute this embodiment of the high intensity microwave apparatus of the present invention should produce about 400 pounds of potato chips per hour. Similarly, as discussed above the power supplies 56 may generate any desired or permitted frequency in the microwave band of the spectrum. Thus, for example, the power supplies 56 could generate microwaves at 915 MHz with the travelling wave waveguides in each separate waveguide set having cross-sectional dimensions designated by the military specification mil.spec. WR9.75. Alternatively, of course, different microwave frequencies could be employed for the different power supplies 56, if desired. The separate waveguides, however, would have to be dimensioned in accordance with these differing frequencies.

After exposure to the high intensity microwave field so as to puff the potato slices and roughen their exterior surface texture, further processing of the slices is still required to dry them into potato chips. This final drying step can be advantageously accomplished by a low power multi-mode microwave drying unit. In the presently preferred embodiment suitable for preparing potato chips, a conventional microwave "baking unit" Model No. IV-60, available from MICRODRY INC. of Crestwood, Ky., is employed. This unit is typically 48 feet long and includes a microwave-transparent conveyor belt which is 6 feet wide. The conveyor belt is disposed between two perforated stainless steel plates disposed parallel to one another so as to form a multimode microwave cavity. Microwaves are injected into this cavity through two waveguides disposed along the top of the cavity with apertures communicating between the waveguide and the cavity. Normally four 60 Kilowatt microwave generators are coupled to the waveguide to provide a total power input of 240 kilowatt into the microwave cavity. The intensity of the microwave field within the MICRODRY baking unit, however, is significantly lower than the field intensity within the meander waveguide 14 because of the substantially larger size of the microwave cavity in the baking unit. Typically a maximum energy density available from this unit for the microwave field within the baking unit is on the order of 6 watts per square inch. This energy density is sufficient to dry the partially processed potato slices but would not cause the puffing and surface roughening that occurs in the microwave field exposure of the cooking step. The actual microwave energy density employed, however, depends both on the chip density desired within the baking unit and the rate of travel for chips through the unit. If a maximum travel rate is desired so as to optimize chip production, then the maximum 240 kilowatt power input would preferably be employed. As used in this description, the term low intensity microwave field means a field intensity that is insufficient to induce these effects.

During this final drying stage of the chip preparation process, the moisture content of the potato slices is reduced to a final amount of about 2% to 4% by weight. Typically the conveyor belt moves at a rate of ten to fifteen feet per minute, providing an exposure time for the potato slices of between about 3.2 and 4.8 minutes. Hot air is also injected into the microwave cavity at a temperature of about 180° to 200° F. at a rate of approximately 200 feet per minute. This hot air movement prevents condensation within the drying cavity and contributes to the final crispening of the chips. During this stage of the chip preparation process, the chips need not be arranged in a single layer to achieve satisfactory drying and, in the preferred embodiment, are arranged in layers of up to approximately 4 inches deep.

Referring to FIG. 5, the MICRODRY baking unit 30 is shown adjacent the high intensity microwave apparatus 10. A conveyor belt 32 of the baking unit 30 may be disposed slightly underneath an output end 34 of the conveyor belt 20 to catch the potato slices 12 as they leave the microwave apparatus 10. If desired, spraying units 36 may be disposed at the output end 34 of the conveyor belt 20 to apply seasonings to the partially cooked potato slices before final drying. Such seasonings are typically employed to add "barbecued" and similar flavorings to the chip. The chips leaving the baking unit 30 are in final form, ready for any desired final inspection and subsequent packaging.

Application of the method and apparatus of the present invention to potato slices produces a potato chip having the well recognized texture, consistency and flavor of the traditionally deep fat fried potato chip, but lacking any added fat. Further advantages of the present invention includes an extended shelf life for the resulting chips as well as the elimination of certain chip preparation safety hazards commonly associated with working around large quantities of hot oil necessary for batch preparation of potato chips.

The following examples illustrates an embodiment of the present invention:

EXAMPLE I

Fresh raw Idaho Russet potatoes are first sliced, peeled and water washed. The raw potato slices are then placed on a polypropylene conveyor belt in a single layer. The potato slices are arranged as close to one another as possible without contacting with one another as so to avoid arcing when the potato slices are exposed to the high intensity microwave field. The polypropylene conveyor belt then transports the potato slices through a meander microwave waveguide having a 30 kilowatt input at 915 MHz. This waveguide includes five straight-line portions through which the potato slices are carried by the conveyor belt. The waveguide is approximately 4.875 inches wide and the conveyor belt travels at a speed of 18-20 feet per minute, resulting in an exposure time of 1.25 to 1.66 seconds each time the potato slices are conveyed through a straight-line section of the waveguide. The output from this initial conveyor belt is positioned at the input to a Model No. IV-60 microwave and hot air drying unit available from MICRODRY INC. of Crestwood, Ky. The drying unit includes a multi-mode microwave cavity having a 240 kilowatt input and transferring approximately 80% of this energy input into the potato slices. Hot air at 180° to 200° F. is transported through the drying unit at 200 cubic feet per minute. The drying unit is 48 feet long and transports the potato slices at a rate of 10 to 15 feet per minute, resulting in an exposure time of 3.2 to 4.8 minutes. Potato slices transported through the baking unit are layered approximately 3 to 4 inches thick. The resulting potato chips prepared in this fashion have an appearance and taste similar to potato chips prepared by deep fat frying in that their surface texture is roughened and the moisture content of the resultant chip is reduced to about 2 percent by weight without any oil or fat having been added to the chip.

EXAMPLE II

While the present invention has been described with reference to the preparation of potato chips, other chips may similarly be prepared by the inventive method described above. Thus, for example, corn chips, tortilla chips and the like can similarly be prepared by forming a corn meal dough into appropriately configured slices for transport through the high intensity microwave field. Additionally, while single mode microwave waveguides are employed to optimize the preparation and transfer of microwave energy to the potato slices, multimode microwaves could be employed in the novel cooking step of the present invention if desired, so long as sufficiently high microwave power levels are employed. Those skilled in the art will appreciate that various substitutions, omissions, modifications and changes may be made in the method and apparatus of the present invention without departing from the scope or spirit thereof. Accordingly it is intended that the foregoing description be considered merely exemplary of the present invention and not a limitation thereof.

Raw potato slices were replaced on the conveyor belt 20 of the apparatus illustrated in FIG. 2, and described above, with the conveyor belt 20 stationary so that the potato slices remained within the straight line portions 14a of the microwave waveguide 14 for the full interval of their microwave exposure. The power level of the microwave input to the waveguide 26 was then varied between 4 kilowatts and 1 kilowatt for exposure periods of 3 minutes and 5 minutes at each power level. New sets of raw potato slices were used each time the power output level was increased or the exposure time changed. At power input levels of 4 kilowatts for periods of about 3 minutes the potato slices puffed into normal chips. Similarly, injecting 3 kilowatts into the microwave waveguide 14 for a period of 3 minutes appeared to puff the raw slices into normal chips, although a very slight degree of starch migration was observed. When 2 kilowatts were coupled into the waveguide for a 3 minute exposure, however, a gelatinous starch build up was quite evident and negligible puffing of the potato slice resulted. Coupling 1 kilowatt into the waveguide 14 for 3 minutes created significant gelatinous build up without any observable puffing of the potato slice. New sets of raw potatoes were again placed in the microwave waveguide 14 for 5 minute exposure periods with power levels of 2 kilowatts and 1 kilowatt injected into the waveguide 14. The increased duration of microwave exposure induced negligible to very slight puffing in the potato slices and only served to turn the gelatinous layer of starch very hard. Thus using a 915 MHz microwave power source coupled to a mil.spec.WR9.75 waveguide, a minimum of 3 kilowatts are required to achieve the desired result of cooking a potato slice by the method of the present invention. A "sizzling" sound indicative of steam venting from the potato slices was audible at the 3 and 4 kilowatt power levels at which the potato slices could be satisfactorily cooked in accordance with the method of the present invention and that this sound was absent at the 1 and 2 kilowatt power levels.

What is claimed is:

1. A process for making low fat chips from uncooked product slices, comprising the steps of:
   removing surface moisture from the product slices;
   exposing the product slices to a microwave field having a sufficiently high intensity to reduce the water content by weight of the slice by at least half and to puff the slices within an interval of about three minutes; and
   subsequently drying the product slices to form a chip.

2. The process of claim 1 wherein the moisture content by weight of the raw product slices is reduced between five and six percent in the surface moisture removal step.

3. The process of claim 1 wherein the surface moisture removal step is performed by subjecting the uncooked product slices to hot air currents.

4. The process of claim 3 wherein the hot air currents are at a temperature of approximately 150 to 250 degrees Fahrenheit.

5. The process of claim 1 wherein the step of drying the product slices is performed by low intensity microwaves.

6. The process of claim 5 wherein the step of drying the product slices further includes the use of hot air convection heating.

7. The process of claim 1 wherein the uncooked product slices are raw potato slices.

8. The process of claim 7 further comprising the step of applying seasoning to the potato slices after the step of subsequently drying the potato slices to form a chip.

9. The process of claim 7 wherein the intensity of the high intensity microwave field is sufficiently high to reduce the water content by weight of the potato slice to about 25% to 30% within an interval of about 3 minutes.

10. The process of claim 7 wherein the step of subsequently drying the product slices reduces the water content of the potato slices to about 2% to 4% by weight.

11. The process of claim 1 wherein the intensity of the high intensity microwave field is sufficiently high to reduce the water content by weight of the potato slice by at least half within 30 seconds.

12. The process of claim 7 wherein the surface moisture removal step reduces the moisture content by weight of the raw potato slice between 5 and 6%.

13. A process for making low fat chips from uncooked product slices, comprising the steps of:
   exposing the product slices to microwave energy in a waveguide coupled to a microwave source having a power output of at least 3 kilowatts for a time period sufficient to puff the slices; and
   subsequently drying the product slices to form a chip.

14. The process of claim 13 further comprising the step of removing most of the surface moisture from the raw product slice before exposing the product slices to microwave energy.

15. The process of claim 14 wherein moisture content by weight of the raw product slices is reduced between five and six percent in the surface moisture removal step.

16. The process of claim 14 wherein the surface moisture removal step is performed by subjecting the raw product slices to hot air currents.

17. The process of claim 16 wherein the hot air currents are at a temperature of approximately 150 to 250 degrees Fahrenheit.

18. The process of claim 13 wherein the step of subsequently drying the product slices is performed by low intensity microwaves.

19. The process of claim 18 wherein the step of subsequently drying the product slices further includes the use of hot air convection heating.

20. The process of claim 13 wherein the uncooked product slices are raw potato slices.

21. The process of claim 20 further comprising the step of applying seasoning to the potato slice after the step of subsequently drying the product slices to form a chip.

22. The process of claim 20 wherein the intensity of the high intensity microwave field is sufficiently high to reduce the water content by weight of the potato slice to about 25% to 30% within an interval of about 3 minutes.

23. The process of claim 20 wherein the step of subsequently drying the product slices reduces the water content of the potato slices to about 2% to 4% by weight.

24. The process of claim 20 wherein the surface moisture removal step reduces the moisture content by weight of the raw potato slice between 5 and 6%.

25. A product made by the process of first exposing an uncooked product slice to microwave energy in a waveguide coupled to a microwave source having a power output of at least 3 kilowatts for a time period sufficient to puff the slice and then drying the slice, so as to produce a chip without any added fat.

26. The chip of claim 25 wherein the uncooked product slice is a potato slice and the resulting chip is an oil free potato chip.

27. A product made by the process of first exposing an uncooked product slice to a microwave field having a sufficiently high intensity to reduce the water content by weight of the slice by at least half and to puff the slice within an interval of about 3-5 minutes and then drying the slice so as to produce a chip without any added fat.

28. The chip of claim 27 wherein the product slice is a potato slice and the resulting chip is an oil free potato chip.

29. A process for making low fat chips from uncooked product slices, comprising the steps of:
exposing the product slices to a microwave field having a sufficiently high intensity to reduce the water content by weight of the slice by at least half and to puff the slices within an interval of about three minutes; and
subsequently drying product slices to form a chip.

30. The process of claim 29 further comprising the step of removing surface moisture from the product slices before the exposure step, wherein the moisture content by weight of the raw product slices is reduced between five and six percent in this surface moisture removal step.

31. The process of claim 29 wherein the surface moisture removal step is performed by subjecting the uncooked product slices to hot air currents.

32. The process of claim 31 wherein the hot air currents re at a temperature of approximately 150 to 250 degrees Fahrenheit.

33. The process of claim 29 wherein the step of drying the product slices is performed by low intensity microwaves.

34. The process of claim 33 wherein the step of drying the product slices further includes the use of hot air convection heating.

35. The process of claim 29 wherein the uncooked product slices are raw potato slices.

36. The process of claim 35 further comprising the step of applying seasoning to the potato slices after the step of subsequently drying the potato slices to form a chip.

37. The process of claim 35 wherein the intensity of the high intensity microwave filed is sufficiently high to reduce the water content by weight of the potato slice to about 25% to 30% within an interval of about 3 minutes.

38. The process of claim 35 wherein the step of subsequently drying the product slices reduces the water content of the potato slices to about 2% to 4% by weight.

39. The process of claim 29 wherein the intensity of the high intensity microwave field is sufficiently high to reduce the water content by weight of the potato slice by at least half within 30 seconds.

* * * * *